United States Patent [19]

Seifers

[11] 4,136,334
[45] Jan. 23, 1979

[54] TIMED ALARMING USING LOGICAL INVERTERS

[75] Inventor: Monte G. Seifers, Waltham, Mass.

[73] Assignee: Digequip Security Industries, Inc., Nashville, Tenn.

[21] Appl. No.: 808,672

[22] Filed: Jun. 21, 1977

[51] Int. Cl.² ............... G08B 13/22; B60R 25/10
[52] U.S. Cl. .............................. 340/529; 340/63; 340/309.1
[58] Field of Search ............... 340/63, 64, 213 R, 276, 340/309.1; 307/10 AT

[56] References Cited

U.S. PATENT DOCUMENTS 3,858,175  12/1974  Kopera, Jr. ................. 340/63
3,930,226  12/1975  Plumberg .................... 340/64

Primary Examiner—Alvin H. Waring
Attorney, Agent, or Firm—Charles Hieken

[57] ABSTRACT

A triggered before disarmed alarm system especially useful in connection with an automobile alarm uses CMOS circuitry and appropriate supply filtering having one hex-inverter integrated circuit as the only active component beside the output transistor. Diodes couple a negative immediate trigger, positive and negative delayed triggers and a disarm potential to various ones of the six inverters to render the output transistor conductive and signify an alarm condition only when an alarm condition is signified by a sequence of inputs consistent with unauthorized entry.

8 Claims, 1 Drawing Figure

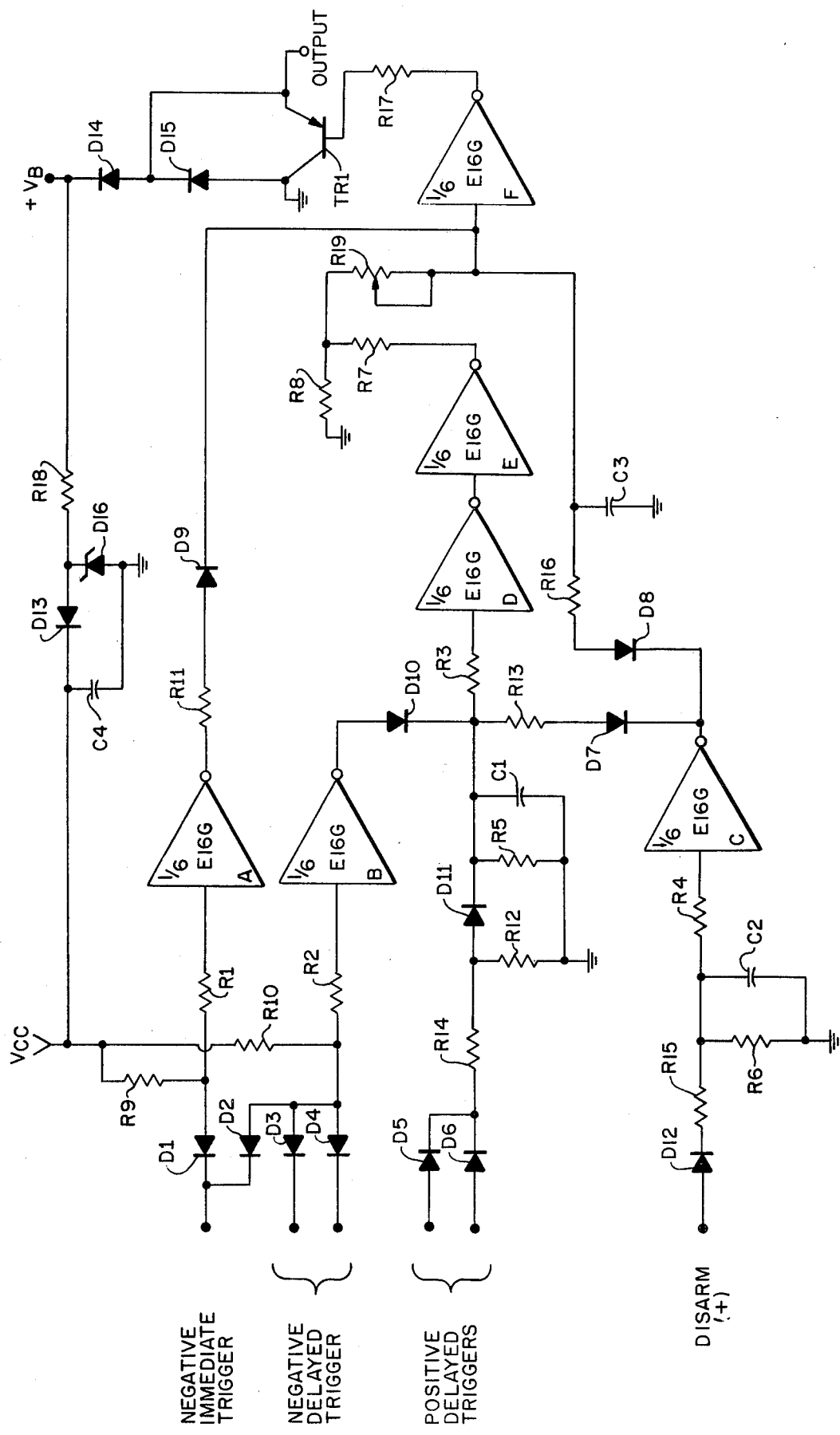

TIMED ALARMING USING LOGICAL INVERTERS

BACKGROUND OF THE INVENTION

The present invention relates in general to timed alarm systems and in particular to improved apparatus for interdependent timing mechanisms that create a triggered before disarmed alarm system. Additionally, provision is made for automatic reset to standby after all input triggers are set to normal and a predetermined amount of time has transpired.

The present invention has as an important object the provision of an output source dependent upon a negative going input pulse or a positive going input pulse and a preset entry time delay; or a negative going input pulse without entry time delay function; all of which are interdependent upon the state of a disarm input and its associated exit delay function.

Another important object of the invention is to provide the interdependent timing functions using a minimum of component size and complexity with minimal quiescent (standby) current. This is accomplished by using CMOS integrated circuitry with appropriate supply filtering. The present invention requires only one hex-inverter integrated circuit which is the only active component excepting the output transistor. This is an important feature of the present invention.

It is a further object of the invention to achieve the foregoing objects with reliably operating apparatus yielding repeatable output indications and virtually insensitive to all but the most severe variations in the input supply.

SUMMARY OF THE INVENTION

According to the invention, means are provided to accept input triggering either in an entry-time delayed fashion by negative going or positive going pulses or by a negative going pulse that does not yield a delayed response. The present invention provides two each of the negative type and positive type delayed inputs and one non-delayed negative input.

It is preferred that the system be installed in such a way as to require the triggering of a delayed input before access to the disarm can be accomplished. The non-delayed input should be utilized where normal access can be accomplished while the disarm input is held at its high potential.

Other features, objects and advantages of the invention will become apparent from the following specification when read in connection with the accompanying drawing, the single FIGURE of which:

BRIEF DESCRIPTION OF THE DRAWING is a diagram showing the logical and electrical arrangement of an embodiment of the invention.

DETAILED DESCRIPTION OF PREFERRED EMBODIMENTS

Referring to the drawing, there is shown a schematic circuit diagram of an exemplary embodiment of the invention. Zener diode D16 and associated circuitry comprise means for converting the battery potential $V_B$ of a typical automobile into a regulated filtered potential $V_{CC}$. The positive and negative delayed triggers inputs, which may be generated when a door is opened, produce an alarm condition on the output unless a disarm potential is applied to the disarm input within a predetermined interval while the negative immediate trigger input produces an alarm condition on the output in response to a condition, such as opening the hood or trunk, in the absence of a disarm potential on the disarm input. The A portion of the E16G hex-inverter and associated circuitry couples the negative immediate trigger input to the input of the output inverter F coupled to the base of the normally nonconductive output transistor $TR_1$.

Diode $D_2$ also couples the negative immediate trigger input to the input of the B inverter that also receives negative delayed triggers provided through diodes $D_3$ and $D_4$ and is coupled by diode D10 to the input of the cascaded D and E inverters which, when enabled in the absence of a disarm potential, provide a signal to the output inverter F that renders the output transistor $TR_1$ conductive. Diodes $D_5$, $D_6$ and $D_{11}$ and associated circuitry couple positive delayed triggers to the input of the cascaded D and E inverters. Diode D12 and associated circuitry couples the disarm potential on the disarm input to the input of the C inverter to disable the D, E and F inverters when the disarm potential is present, resistor $R_6$ and capacitor $C_2$ comprising a delay network for keeping the latter inverters disabled for a time interval sufficient to enable a person to leave a car, for example, after removing the disarm potential.

The specific means for providing the various triggers, such as door, window, hood and trunk alarm switches and a key switch for arming the alarm system are well-known in the art, not a part of the invention and not described herein to avoid obscuring the principles of the invention. Having generally described the structural arrangement of the invention, its mode of operation will be described.

The terms high and low are used in the description to denote the potential relative to ground with low being at or near ground potential and high being of sufficient potential to cause an inverter to be held in a high input condition.

(A) At standby, the disarm input is held open or at ground potential and capacitor $C_2$ is uncharged. When held at this state, the following inputs result in the described conditions:

1. If a negative delayed trigger input or a negative immediate trigger input is forced to ground potential or slightly above, the input of inverter B goes low which forces the output of B high, rapidly charging capacitor $C_1$ through diode D10 and causing the input of inverter D to go high.

2. If a positive delayed trigger input is forced high, capacitor $C_1$ is charged through resistor R14 and diode D11, again causing the input of inverter D to go high.

3. When the input of inverter D is high, the output of inverter E is forced high, and capacitor $C_3$ is allowed to charge through resistor $R_7$ and entry delay adjustment resistor R19. After capacitor $C_3$ reaches sufficient potential, the output of inverter F goes low which causes output transistor TR1 to conduct from emitter to collector. This ground supply output may be used to drive a relay that may, for example, disable the automobile ignition.

4. If the negative immediate trigger input has been forced low, then capacitor $C_3$ is rapidly charged through resistor R11 and diode $D_9$, causing an effectively immediate output response.

5. After trigger inputs are removed, capacitor $C_1$ is allowed to discharge through resistor $R_5$ having other paths of discharge blocked by diodes D10 and D11, the high output state of inverter C and the enormously high input impedance of inverter D. This slow discharge holds the input of inverter D at its high state which in turn holds the output of inverter E high and, assuming $C_3$ has reached sufficient potential, holds the output of inverter F low which causes conduction of output transistor TR1.

(B) When the disarm input is forced high, capacitor $C_2$ is rapidly charged through diode D12 and resistor D15, causing the output of inverter C to go low. After the disarm input is removed, capacitor $C_2$ is allowed to discharge through resistor $R_6$, having other paths of discharge being blocked by diode D12 and the enormously high input impedance of inverter C. This slow discharge holds the output of inverter C at its low state which in turn causes the input of inverter F to be forced low which results in a no output condition. Also, capacitors $C_1$ and $C_3$ are discharged through resistor R13, diode $D_7$ and resistor R16, diode $D_8$ respectively. Capacitors $C_1$ and $C_3$ are not permitted to charge to high potential until the output of inverter C goes high. This allows a means of providing an exit delay disarm before standby condition is established.

TABLE I

| | |
|---|---|
| E166 | 4049 CMOS HEX-INVERTER/BUFFER |
| TR1 | TIP30 PNP POWER TRANSISTOR |
| D16 | 1N5245 15 VOLT 500 MW ZENER DIODE |
| D13-D15 | 1N4001 1 AMP 50 PIV DIODES |
| D10-D12 | 1N914 OR 1N4148 DIODES |
| D1-D9 | CA3141E DIODE ARRAY (30 VOLT PIV) |
| C1-C4 | 50 MFD 15 VOLT ELECTROLYTIC CAPACITOR |
| R19 | 500 K-OHM TRIMMER RESISTOR |
| R18 | 100 OHM ¼ WATT RESISTOR |
| R17 | 500 OHM ¼ WATT RESISTOR |
| R14-R16 | 1.0 K-OHM ¼ WATT RESISTOR |
| R12-R13 | 4.7 K-OHM ¼ WATT RESISTOR |
| R9-R11 | 10 K-OHM ¼ WATT RESISTOR |
| R7-R8 | 100 K-OHM ¼ WATT RESISTOR |
| R5-R6 | 1.0 MEGOHM ¼ WATT RESISTOR |
| R1-R4 | 2.2 MEGOHM ¼ WATT RESISTOR |

There has been described novel apparatus and techniques for economically and reliably providing a trigger before disarmed alarm system with automatic reset to standby after all input triggers are set to normal and predetermined amount of time transpired with reliable economical compact circuitry that dissipates negligible power in the rest condition. Attached Table I sets forth specific parameter values in a preferred embodiment. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

What is claimed is:

1. Alarm circuitry comprising,
   an immediate trigger input for receiving a signal for causing an immediate alarm condition in the absence of a disarm signal,
   at least one delayed trigger input for receiving an alarm triggering signal for providing an alarm condition only if a disarm signal remains absent for a predetermined time interval,
   a disarm input for receiving said disarm signal,
   an output logical inverter means for providing an alarm signal only in response to the occurrence of an immediate trigger signal on said immediate trigger input concurrently with the absence of a disarm signal on said disarm input and/or the occurrence of a delayed trigger signal on said delayed trigger input and the absence of a disarm signal on said disarm input outside a predetermined delay interval,
   and means for intercoupling said inputs and said output inverter,
   the latter means for intercoupling consisting only of diodes, resistors, capacitors and inverters,
   whereby the quiescent current drawn by said circuitry in the absence of an alarm condition is negligible.

2. Alarm circuitry in accordance with claim 1 wherein said inverters consist of a single hex-inverter integrated circuit.

3. Alarm circuitry in accordance with claim 2 and further comprising a normally nonconductive output transistor for providing an output current when enabled by said output inverter.

4. Alarm circuitry in accordance with claim 2 wherein said means for intercoupling includes means comprising an A inverter for coupling said immediate trigger input to said output inverter,
   and means including cascaded D and E inverters for coupling said delayed trigger input and said disarm input to said output inverter.

5. Alarm circuitry in accordance with claim 4 wherein said means for intercoupling further comprises means including a B inverter for coupling said delayed trigger input to said cascaded D and E inverters.

6. Alarm circuitry in accordance with claim 5 wherein said means for intercoupling further comprises a C inverter comprising means for coupling said disarm input to the input of said cascaded D and E inverters.

7. Alarm circuitry in accordance with claim 6 wherein said means for intercoupling comprises a capacitor connected to the input of said output inverter and through resistive means to the output of said cascaded D and E inverters for furnishing a delay of the inversion by said F inverter in the absence of a signal on said negative immediate trigger and the absence of a disarm signal on said disarm input outside a predetermined delay interval.

8. Alarm circuitry in accordance with claim 7 wherein said means for intercoupling includes a resistor capacitance network direct coupled to the input of said C inverter and said disarm input for furnishing a predetermined delay when a disarm signal is removed from said disarm input.

* * * * *